(12) United States Patent
Shim et al.

(10) Patent No.: US 11,955,679 B2
(45) Date of Patent: Apr. 9, 2024

(54) ENERGY HARVESTING DEVICE

(71) Applicant: INDUSTRY-ACADEMIC COOPERATION FOUNDATION, YONSEI UNIVERSITY, Seoul (KR)

(72) Inventors: Wooyoung Shim, Seoul (KR); Sungsoon Kim, Ulsan (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 148 days.

(21) Appl. No.: 17/321,340

(22) Filed: May 14, 2021

(65) Prior Publication Data

US 2021/0376369 A1 Dec. 2, 2021

(30) Foreign Application Priority Data

May 27, 2020 (KR) .................. 10-2020-0063408

(51) Int. Cl.
*H01M 8/22* (2006.01)
*H01M 8/0276* (2016.01)
*H01M 8/0286* (2016.01)

(52) U.S. Cl.
CPC ......... *H01M 8/227* (2013.01); *H01M 8/0276* (2013.01); *H01M 8/0286* (2013.01)

(58) Field of Classification Search
CPC .. H01M 8/227; H01M 8/0276; H01M 8/0286; H01M 8/08; H01M 10/36; H01M 2250/30; Y02E 60/10; Y02E 60/50
See application file for complete search history.

(56) References Cited

U.S. PATENT DOCUMENTS

2016/0059189 A1 3/2016 Yu
2018/0353906 A1 12/2018 Mottet et al.

FOREIGN PATENT DOCUMENTS

KR 20170131531 A 11/2017
KR 20180057640 A 5/2018

OTHER PUBLICATIONS

Korean Intellectual Property Office, Notice of Allowance Issued in Application No. 2020-0063408, dated Jan. 27, 2022, 7 pages.

*Primary Examiner* — Ula C Ruddock
*Assistant Examiner* — Sarika Gupta
(74) *Attorney, Agent, or Firm* — McCoy Russell LLP

(57) ABSTRACT

Provided is an energy harvesting device for producing electric power by conduction of alkali ions, including a laminated film in which two-dimensional (2D) materials are laminated and assembled, wherein the laminated film includes a first region into which alkali ions are introduced, a second region into which alkali ions are introduced at a concentration lower than that of the first region or into which alkali ions are not introduced, and a third region located between the first region and the second region to divide the first region and the second region, and in which an interlayer distance between the 2D materials is fixed by physical constraints.

18 Claims, 15 Drawing Sheets

ENERGY HARVESTING DEVICE

CROSS-REFERENCE TO RELATED APPLICATIONS

This application claims priority under 35 U.S.C. § 119 to Korean Patent Application No. 10-2020-0063408, filed on May 27, 2020, in the Korean Intellectual Property Office, the disclosure of which is incorporated herein by reference in its entirety.

TECHNICAL FIELD

The following disclosure relates to an energy harvesting device based on a neuromorphic energy generation mechanism that generates electromotive force in neurons, and in particular, to a neuromorphic energy generation-based energy harvesting device which is flexible and portable, for which capacity is easily adjusted, and which is capable of producing electric power with abundant inexpensive resources.

BACKGROUND

A cell body of a neuron is surrounded by a cell membrane, which is a lipid double membrane that behaves like a two-dimensional (2D) fluid. In cell membranes, channels are ion-specific pores that allow certain ions such as $Na^+$, $K^+$, and $Ca^{2+}$ to flow across the membrane by a concentration gradient. These ion channels generate a temporary change in a potential of the cell membrane, also known a so-called action potential. These energy-efficient electrical signals are the fastest means of communication in the body, spreading across cell membranes at tens of meters per second, and $10^7$ ions spread across the membranes per second.

Ion channels that generate electromotive force (EMF) in neurons have several important properties as follows. First, size characteristics in which a pore size of the channel is similar to a size of a cation flowing through the channel and is smaller than a size of a hydrated state of the cation, second, filtering characteristics of increasing cation selectivity by carboxyl groups provided by aspartic acid and glutamic acid, etc., and third, structural stability characteristics of preventing expansion/separation of channels in a liquid medium by hydrogen bonding of an amino group provided from lysine with a nearby chain.

As in US Patent Laid-Open Publication No. 2018-0353906, technologies for an energy producing device using several selective ion transport technologies have been developed, but an energy harvesting device that imitates neuromorphic energy generation to generate electromotive force (EMF) from neurons, while satisfying all of the size characteristics, filtering characteristics, and structural stability characteristics, is yet to be developed.

RELATED ART DOCUMENT

Patent document

US Patent Laid-Open Publication No. 2018-0353906

SUMMARY

An exemplary embodiment of the present invention is directed to providing an energy harvesting device based on neuromorphic energy generation, and in particular, to providing an energy harvesting device that satisfies all of size characteristics, filtering characteristics, and structural stability characteristics.

Another exemplary embodiment of the present invention is directed to providing an energy harvesting device which is flexible and portable, for which capacity is easily adjusted, and which is capable of producing electric power with abundant inexpensive resources.

Another exemplary embodiment of the present invention is directed to providing an energy harvesting device free from an electrolyte.

In one general aspect, an energy harvesting device for producing electric power by conduction of alkali ions includes a laminated film in which two-dimensional (2D) materials are laminated and assembled, wherein the laminated film includes: a first region into which alkali ions are introduced; a second region into which alkali ions are introduced at a concentration lower than that of the first region or into which alkali ions are not introduced; and a third region located between the first region and the second region to divide the first region and the second region, and in which an interlayer distance between the 2D materials is fixed by physical constraints.

The energy harvesting device may further include a liquid in which moisture contained in a vapor phase is transformed into a liquid phase between layers of the 2D materials.

Ends of each of the first and second regions may be terminals electrically connected to the outside of the laminated film.

In the third region, an interlayer distance of the laminated film may be 4 Å to 9 Å.

The physical fixing may be made by a resin strip attached to the laminated film so as to cover both sides of the laminated film by traversing the laminated film in a width direction.

A length of the resin strip in a direction from the first region to the second region may be 0.5 mm to 10 mm.

The energy harvesting device may further include a moisture supply unit supplying moisture to a vapor phase in contact with the laminated film.

An average diameter of the 2D materials may be in the order of $10^2$ nanometers to $10^1$ micrometers.

The 2D material may be graphene, graphene oxide, MXene, transition metal dichalcogenide, or a combination thereof.

The 2D material may have an anionic functional group.

The anionic functional group may include a hydroxy group and a carboxyl group, and a ratio obtained by dividing a peak value of an O—H absorption peak by a peak value of an C═O absorption peak in a Fourier transform infrared (FT-IR) spectrum of the laminate may be 2.0 or more.

A water contact angle of the laminate may be 35° or less.

When the following conditions 1, 2, and 3 are satisfied, an ohmic conductance between the first region and the second region may satisfy Equation 1.

Condition 1: The first region and the second region have the same alkali ion concentration.

Condition 2: A length of the third region in a direction from the first region to the second region is 0.5 mm to 10 mm.

Condition 3: A voltage sweep range is −0.3V to +0.3V.

$$1.3 \leq G_{Na}/G_K \quad \text{(Equation 1)}$$

In Equation 1, $G_{Na}$ is a conductance (µS) when the alkali ion is Na+, and $G_K$ is a conductance (µS) when the alkali ion is $K^+$.

A total power or output voltage harvested by the energy harvesting device may be controlled by one or more selected from one or more physical factors selected from a thickness, width, and length of the laminated film; and one or more chemical factors selected from a total number of moles of alkali ions introduced into the first region and a total number of moles of alkali ions introduced into the second region.

A specific capacity of the energy harvesting device may be 4000 μAh/g or more.

The present invention may include an energy harvesting module to which the aforementioned energy harvesting device is connected in series.

The energy harvesting module may include a substrate; and two or more energy harvesting devices arranged to be spaced apart from each other on one surface of the substrate and connected in series.

The present invention may include a device to which power is supplied by the energy harvesting module described above.

In another general aspect, a method of using the energy harvesting device described above may be provided.

The method of using the energy harvesting device includes: sealing at least the laminated film of the energy harvesting device described above using a sealing member to block contact with the atmosphere; and removing the sealing member at the time of using the device to expose at least the laminated film of the energy harvesting device to the atmosphere.

In another general aspect, a method of manufacturing the energy harvesting device described above may be provided.

The method of manufacturing the energy harvesting device includes: a) forming a resin strip by applying and curing a curable resin to cover both sides of a laminated film by traversing the laminated film in a width direction to divide the laminated film in which two-dimensional (2D) materials are stacked and assembled into a first region and a second region; and b) applying a first liquid containing alkali ions to the first region and drying the first liquid to introduce alkali ions into the first region.

Operation b) may include applying a second liquid having an alkali ion concentration lower than that of the first liquid to the second region and drying the second liquid.

Other features and aspects will be apparent from the following detailed description, the drawings, and the claims.

DETAILED DESCRIPTION OF EXEMPLARY EMBODIMENTS

Figure 1:
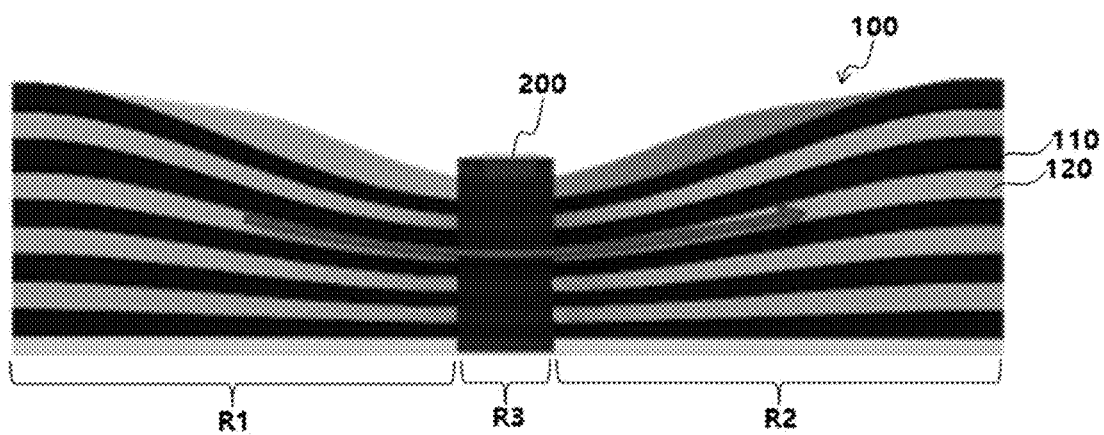
FIG. 1 is a perspective view showing an energy harvesting device according to an exemplary embodiment of the present invention.

Hereinafter, an energy harvesting device according to the present invention will be described in detail with reference to the accompanying drawings. The drawings presented hereinafter are provided as examples to sufficiently transmit the technical concept of the present invention. Thus, the present invention is not limited to the drawings presented hereinafter and may be embodied in a different form, and the drawings present hereinafter may be exaggerated to be illustrated to clarify the technical concept of the present invention. Here, technical terms and scientific terms have the same meaning as generally understood by a person skilled in the art to which the present invention pertains, unless otherwise defined, and a detailed description for a related known function or configuration considered to unnecessarily divert the gist of the present invention will be omitted in the following descriptions and accompanying drawings.

Also, as used herein, the singular forms used in the specification and claims are intended to include the plural forms as well, unless the context clearly indicates otherwise.

In the present invention and the appended claims, terms such as first and second are not meant to be limited, but are used for the purpose of distinguishing one component from other components.

In the present invention and the appended claims, terms such as include or have mean that features or components described in the disclosure exist, and do not exclude a possibility of addition of one or more other features or components, unless otherwise mentioned.

In the present invention and the appended claims, when a portion such as a film (layer), a region, a component, etc. is said to be on or on another portion, it may include not only a case in which the portion is immediately on another portion in contact therewith but also a case in which another film (layer), another region, another component, etc. is interposed therebetween.

An energy harvesting device, which is an energy harvesting device for producing electric power (including electromotive force) by conduction of alkali ions according to the present invention includes a laminated film in which two-dimensional (2D) materials are laminated and assembled, wherein the laminated film includes: a first region into which alkali ions are introduced; a second region into which alkali ions are introduced at a concentration lower than that of the first region or into which alkali ions are not introduced; and a third region located between the first region and the second region to divide the first region and the second region, and in which an interlayer distance between the 2D materials is fixed by physical constraints.

As known, a 2D material is a material having 2D crystallinity, and a strong chemical bond such as a covalent bond or an ionic bond is formed in the 2D materials (or 2D crystal layer), while the 2D crystal layers are combined by a weak attractive force such as van der Waals force. A laminated film in which such 2D material layers (2D crystal layers) are stacked and assembled may provide an interlayer distance of several Å levels due to weak van der Waals bonding between the layers.

Alkali ions are introduced into the first region of the laminated film, and alkali ions having a concentration lower than that of the first region may be introduced into the second region or alkali ions are not introduced thereto. Accordingly, a difference in concentration of alkali ions may be formed between the first region and the second region. Accordingly, the first region may be referred to as a high concentration region and the second region may be referred to as a low concentration region.

The third region dividing the first region and the second region is a region in which the interlayer distance between the 2D material layers is fixed by physical constraints. Accordingly, even when the laminated film is in contact with a liquid phase, the interlayer distance between the 2D material layers in the third region may be substantially unchanged and maintained as it is.

As described above, the energy harvesting device according to the present invention may have size characteristics and structural stability characteristics, through which the energy harvesting device may produce energy as alkali ions move from the first region to the second region through the third region having a fixed interlayer distance, similar to neuromorphic energy generation.

In the energy harvesting device of the present invention, a concentration of alkali ions in the first region or the second region may be defined by the number of moles of alkali ions per volume (or mass) of the laminated film belonging to the first region or the second region. In this case, instead of the concentration of alkali ions, the number of moles of alkali ions introduced into each region may also be expressed. In this case, the first region and the second region may be defined as the first region into which alkali ions are introduced and the second region into which alkali ions having the number of moles smaller than the number of moles of alkali ions introduced into the first region are introduced or into which alkali ions are not introduced.

In the energy harvesting device of the present invention, physical constraints refer to inhibiting expansion or contraction or expansion and contraction between 2D material layers belonging to the third region by a heterogeneous material (different member) different from the laminated film. Due to the physical constraints, even when the laminated film is immersed in a liquid medium that may penetrate between the 2D material layers to impregnate the laminated film with the liquid medium, an interlayer distance between the 2D material layers in the third region before the impregnation and an interlayer distance between the 2D material layers in the third region after the impregnation may be maintained substantially the same.

Dividing the first region and the second region by the third region may mean that the first region and the second region do not come into direct contact with each other to form a boundary but indirectly come into contact with each other through the third region in all of a thickness direction, a width direction, and a length direction, which are three directions of the laminate perpendicular to each other. Therefore, a specific position or shape of the third region is not particularly limited as long as the third region divides the first region and the second region.

The energy harvesting device according to an exemplary embodiment is free from an electrolyte. That is, in the energy harvesting device according to an exemplary embodiment, a liquid phase (electrolyte) for conducting alkali ions in each of the first region and the second region is not artificially supplied to each of the first region and the second region. Accordingly, the energy harvesting device according to an exemplary embodiment does not require a member for storage and sealing of the electrolyte (liquid phase) and does not cause a decrease in electrolyte or deterioration of battery characteristics due to contamination.

The energy harvesting device according to an exemplary embodiment is free from the electrolyte, and thus, based on a surface of the laminated film (the side of the outermost layer of the laminated 2D material layers in contact with air), the surface does not in contact with the liquid phase and droplets or liquid phases may not be located on the surface.

With this or independently, since the energy harvesting device according to an exemplary embodiment is free from the electrolyte, at least an upper surface and a side surface of the laminated film, excluding the physically constrained region, may be exposed to the atmosphere.

These electrolyte-free characteristics result from the fact that the energy harvesting device is based on a laminated film of a 2D material and a concentration gradient of alkali ions is formed in the 2D laminated film with the third region interposed therebetween.

As described above, the interlayer distance of the laminated film of the 2D material is several Å. Numerous 2D material layers spaced apart from each other by such microscopic gaps may provide an effective heterogeneous nucleation sites for moisture contained in the vapor phase (atmosphere) in contact with the laminated film.

Accordingly, the energy harvesting device may contain a liquid in which moisture contained in the vapor phase is transformed into a liquid phase between layers of the 2D material. The liquid (liquid phase water) generated by heterogeneous nucleation between the layers of the 2D material is not discharged to the outside of the laminated film by a capillary based on an ultra-fine gap, and may be continuously connected to each other between the layers of the 2D material or may fill spaces between the layers of the 2S material to act as a medium through which alkali ions are moved.

In an exemplary embodiment, the 2D material may have an anionic functional group. Typical anionic functional groups formed in the 2D material layer may include one or two or more functional groups selected from carboxyl groups and hydroxy groups. In an exemplary embodiment, the 2D material layer may be formed of an anionic functional group including a carboxyl group and a hydroxy group. The anionic functional group formed in the 2D material layer may generate an electrostatic attraction for cations and an electrostatic repulsive force for anions, so that cation selectivity may be increased in the third region.

When the laminate is a laminated film of a 2D material having an anionic functional group, the energy harvesting device according to an exemplary embodiment may also have filtering characteristics as well as size characteristics and structural stability characteristics. This means that the energy harvesting device according to an exemplary embodiment of the present invention satisfies all three important characteristics of a channel during neuromorphic energy generation.

Specifically, the anionic functional group may include a hydroxy group and a carboxyl group, and a ratio obtained by dividing a peak value of an O—H absorption peak by a peak value of a C═O absorption peak the Fourier transform infrared spectroscopy (FT-IR) spectrum of the laminate may be 2.0 or more, specifically, 2.0 to 5.0, more specifically, 2.5 to 5.0, and more specifically 3.0 to 5.0. When the laminate satisfies the FT-IR spectrum, a gap size of the 2D material layer in a plane direction in the third region may be uniformly maintained, while stably exhibiting filtering characteristics by the anionic functional group. In particular, when the laminate satisfies the FT-IR spectrum, if conducted ions are sodium ions, selective conduction of sodium ions may be improved, compared with competing cations (including other alkali cations).

Furthermore, when the 2D material has an anionic functional group, such an ionic functional group may impart hydrophilicity to the 2D material. When the 2D material has hydrophilicity, liquid water may have a negative curvature between the 2D material layers, so that nucleation of moisture in the atmosphere between the 2D material layers may be generated at lower humidity levels (atmospheric humidity).

In detail, the laminate may have a contact angle (water contact angle) with respect to water droplets of 35° or less, specifically 33° or less, and may be substantially 10° or more. When the laminate has such a water contact angle, an aqueous liquid may be easily formed by heterogeneous nucleation between the 2D material layers under a relative humidity of 40% or more, specifically, 50% or more, and more specifically, 60% or more, so that alkali ions may stably move from the first region to the second region.

FIG. 1 is a perspective view showing an energy harvesting device according to an exemplary embodiment of the present invention. The arrow in FIG. 1 indicates a direction of movement of alkali ions. As shown in the example illustrated in FIG. 1, the laminated layer 100 of the 2D material layer 110 includes a first region R1 into which alkali ions are introduced, a second region R2 into which alkali ions having a low concentration, compared with the first region R1, are introduced or into which alkali ions are not introduced, and a third region R3 physically constrained by a constraining member 200 so that an interlayer distance between the 2D material layers 110 is fixed.

The third region R3 may play a role similar to an ion-specific pore (channel) allowing specific ions to flow across a cell membrane in the cell membrane of a neuronal cell body. That is, the third region R3 serves as a passage through which alkali ions may flow from the first region R1 having a high concentration to the second region R2 having a low concentration, and in addition, since interlayer distance between the 2D material layers 110 are uniformly fixed by the constraining member 200, alkali ions having a size smaller than or similar to the interlayer distance may selectively pass therethrough.

Alkali ions include $Li^+$, $Na^+$, $K^+$, $Ru^+$, $Cs^+$, or a mixture thereof. However, since they are abundantly present on the earth, it is easy to supply raw materials, costs for power production can be significantly reduced, and in order to allow target alkali ions to selectively move through the third region according to size characteristics of the third region in the presence of competing cations. the alkali ion may be $Li^+$, $Na^+$, $K^+$, or a mixture thereof, substantially, $Na^+$.

According to an exemplary embodiment, when the alkali ions conducted in the energy harvesting device are sodium ions, as an extreme and feasible example, electric power may be generated by introducing alkali ions to the first region by introducing seawater to the first region R1 and removing (including evaporating) moisture.

The first region R1 and the second region R2, specifically, the first region R1, the second region R2, and the third region R3, more specifically, the laminated film 100 may be in a state of not containing liquid water, that is, in a sterile state or a non-wet state, based on a state immediately after manufacture.

Thus, in a state immediately after manufacture or before a power generation state in which electric power (including electromotive force) is generated by the energy harvesting device, the alkali ions introduced into the first region R1 may be in a state of being adsorbed to the 2D material belonging to the first region R1. In addition, when alkali ions are also introduced into the second region R2, the alkali ions introduced into the second region R2 may also be in a state of being adsorbed to a 2D material belonging to the second region R2.

A difference in the number of moles of alkali ions introduced into the first region R1 and the second region R2 may mainly affect total electric power that may be harvested by the energy harvesting device. Thus, when the first region R1 and the second region R2 have a constant dimension, a larger amount of electric power may be produced as a difference in concentration of alkali ions between the first region and the second region is larger. In addition, in a case in which the first region R1 and the second region R2 have a certain alkali ion concentration difference, a larger amount of electric power may be produced as the dimensions of the first region and the second region are greater. This is because an electromotive force is generated as alkali ions move from the first region to the second region through the third region due to the difference in concentration of alkali ions between the first region and the second region.

Accordingly, total electric power or output voltage (or output current) harvested by the energy harvesting device may be controlled by one or more selected from one or more physical factors selected from a thickness, width, and length of the laminated film and one or more chemical factors selected from a total number of moles of alkali ions introduced into the first region and a total number of moles of alkali ions introduced into the second region.

The dimensions of the first region R1 and the second region R2 and the concentrations of alkali ions in the two regions (the total number of moles of the introduced alkali ions) may be appropriately adjusted in consideration of power generation characteristics required according to a specific field of application of the energy harvesting system.

In detail, as an example considering a flexible power generation device or a wearable power generation device, a thickness of the laminate may be in the order of $10^{-1}$ μm to $10^2$ μm, a length of the laminate may be in the order of $10^{-1}$ cm to $10^1$ cm, and a width of the laminate may be in the order of $10^{-1}$ cm to $10^1$ cm, but are not limited thereto. In this case, a direction from the first region to the second region of the laminate may be a length direction and a direction perpendicular to the length direction on the same plane of the length direction may be a width direction.

The concentration of alkali ions introduced into the first region (the number of moles of alkali ions per unit volume of the first region) may be in the order of $10^0$ μmol/mm$^3$ to $10^0$ mol/mm$^3$, but is not limited thereto.

As described above, the interlayer distance of the laminated film in the third region R3 may be similar to the size of the alkali ions but may be smaller than a hydrated state of the alkali ions, depending on a specific material of the alkali ions to be conducted. As a specific example, the interlayer distance of the laminated film may be in the order of $10^0$ Å, specifically 1 to 9 Å, 4 to 9 Å, 5 to 9 Å, or 6 to 9 Å, but may be appropriately adjusted according to a specific material of the conducted alkali ions as described above. As a substantial example, when the alkali ions are sodium ions, the interlayer distance of the laminated film which is similar to the size of the alkali ions but satisfies a condition of a size smaller than the hydrated state of alkali ions may be 4 to 9 Å, substantially 5 to 9 Å, and more substantially 6 to 9 Å.

Here, experimentally, the interlayer distance of the laminate (third region) may be calculated through a peak position of a diffraction peak present in a low angle range, e.g., a 2θ range of 5 to 15°, in an X-ray diffraction pattern of the laminate (third region) using Cu Kα rays. In addition, a size allowing the alkali ions to be selectively conducted in the third region may be a size of a gap between the 2D material layers (a size of an empty space in a thickness direction). Such a gap size may be calculated by subtracting the thickness of the 2D material layer itself from the interval of the 2D material layer. For example, a gap size between the 2D material layers in the third region may be 2 to 7 Å, substantially, 3 to 6 Å, or more substantially 4 to 6 Å, but is not limited thereto.

In the third region R3, a concentration gradient of alkali ions may be formed due to a difference in concentration of alkali ions between the first region R1 and the second region R2. A length of the third region R3 (hereinafter, a width of the third region) from the first region R1 to the second region R2 may affect ionic conductance of the energy harvesting device. In order to form a constant alkali ion concentration gradient and stably make intended selective conduction of the alkali ions based on size characteristics, the width of the third region may be 0.5 mm to 10 mm, specifically 1 mm to 6 mm, and more specifically 1 mm to 5 mm, but is not limited thereto.

As described above, the third region R3 is defined as a region constrained by the physical constraining member 200 in the laminated film. Accordingly, the width of the third region R3 may correspond to a width of the physical constraining member 200.

The physical constraining member 200 may be a rigid material which is firmly bonded to the laminated film 100 to physically constrain a change in the interlayer distance between the 2D material layers of the laminated film 100 and which is stable against metal ions, moisture, etc. For example, the physical constraining member 200 may be a resin strip attached to the laminated film 100 to cover both sides (both surfaces in the thickness direction) by traversing the laminated film 100 in the width direction. Here, covering both sides should be interpreted as a meaning of covering a side surface belonging to a previously designed third region, rather than a meaning of covering the entire regions of the side surface of the laminate.

However, since the laminated film 100 is a film in which 2D material layers are laminated, in order to maintain the interlayer distance between the 2D material layers belonging to the third region evenly at a predetermined distance by the physical constraining member, it is preferable that the physical constraining member is firmly bound between the 2D material layers on the side of the laminated film (third region) which the physical constraining member is in contact with and attached to. Accordingly, the resin strip may be a curable resin strip cured after being applied to cover both sides of the laminated film by traversing the laminated film in the width direction so that the first region and the second region are divided according to the design. Due to fluidity of the curable resin, the curable resin may be in close contact and cured with each of the 2D material layers from the side of the laminated film (third region), so that the interlayer distance between the 2D material layers may be fixed uniformly in the entire region in the thickness direction, substantially irrespective of a detailed position according to the thickness.

The curable resin may be heat, light (including UV), and/or a chemically curable resin, and the curable resin may be general curable material that can be manufactured such as a cured polycarbonate-based resin, acrylonitrile butadiene styrene resin, olefin-based resin, epoxy-based resin, melamine-based resin, or unsaturated polyester-based resin. Accordingly, the resin strip may be a cured polycarbonate-based resin, an acrylonitrile butadiene styrene resin, an olefin-based resin, an epoxy-based resin, a melamine-based resin, or an unsaturated polyester-based resin, but is not limited thereto.

Examples of the 2D material layer 110 of the laminate 100 include graphene, graphene oxide, MXene, transition metal dichalcogenide, or a combination thereof. Here, graphene may include reduced graphene oxide (RGO). Graphene oxide is graphene surface-oxidized by a strong oxidizing agent such as a strong acid or a supercritical or subcritical treatment, and may refer to graphene in which oxygen-containing functional groups (hydroxy groups, carboxyl groups, etc.) are formed on a surface thereof. MXene is a transition metal carbide, transition metal nitride or transition metal carbonitride having 2D crystallinity, and MXene may satisfy $M_{n+1}X_n$ according to its nominal composition. The transition metal M may be one or more transition metals selected from the group consisting of IIIB, IVB, VB, VIB and VIIB, and in an exemplary embodiment, transition metal M may be titanium (Ti), zirconium (Zr), hafnium (Hf), vanadium (V), chromium (Cr), manganese (Mn), scandium (Sc), molybdenum (Mo), niobium (Nb), tantalum (Ta), yttrium (Y), tungsten (W) or a combination thereof, but is not limited thereto. X may be carbon, nitrogen, or carbon and nitrogen, and in an exemplary embodiment, X may be carbon. N may be 1, 2 or 3. In MXene, a transition metal carbide, a transition metal nitride, or a transition metal carbonitride having a 2D structure may be terminated with a surface functional group commonly expressed by $T_x$. MXene considering a surface functional group may be represented by $M_{n+1}X_nT_x$, and a surface functional group $T_x$ may include alkoxide, carboxylate, halide, hydroxide, hydride, oxide, nitride, sulfide, thiol, or a combination thereof. Transition metal dichalcogenide may be a compound having a 2D layered structure including a transition metal and a chalcogen element and may satisfy $MX_2$ (M=transition metal, for example, Mo, W, etc., X=chalcogen, for example, S, Se, etc.). The 2D transition metal dichalcogenide has a structure in which a single element layer of a transition metal is located between two element layers of chalcogen, and three atomic layers may gather to form a single 2D material layer.

As described above, the energy harvesting device according to an exemplary embodiment may be free from an electrolyte and may contain a solution 120 formed by heterogeneous nucleation of moisture contained in the atmosphere in the interlayer between the 2D material layers 110, not an electrolyte that is artificially injected. In order to form the aqueous solution 120 by heterogeneous nucleation in the atmosphere containing lower humidity, it is advantageous that the 2D material is hydrophilic, and in terms of satisfying filtering characteristics, it is advantageous to have hydrophilicity by anionic functional groups.

In consideration of these hydrophilic properties and filtering characteristics, it is advantageous that the 2D material is graphene oxide and/or MXene, and in consideration of the size characteristics targeting sodium ions and appropriate conductivity required to be electrically connected with the outside and supply produced electric power to a load, the laminate may be substantially graphene oxide.

In an energy harvesting system according to an advantageous example, an average diameter of the 2D material (layer) of the laminate may be in the order of $10^2$ nanometers to $10^1$ micrometers. Specifically, the average diameter of the 2D material (layer) may be 100 nm to 90 μm, 100 nm to 10 μm, more specifically 100 nm to 900 nm, and even more specifically 100 nm to 700 nm.

Depending on the size of the average diameter of the 2D material (layer), a fraction occupied by a space between the 2D materials in a plane direction, as well as in the thickness direction, of the laminated film may vary. This separation fraction may affect selectivity and conductivity of alkali ions, especially, sodium ions.

In a case in which the average diameter of the 2D material of the laminate is 100 nm to 10 μm, more specifically 100 nm to 900 nm, even more specifically 100 nm to 700 nm level, when the following conditions 1, 2, and 3 are satisfied, ohmic conductance between the first region and the second region may satisfy Equation 1, and specifically, $G_{Na}/G_K$ may be 1.4 or more. In this case, $G_{Na}/G_K$ may be 2.0 or less, but is not limited thereto.

Condition 1: The first region and the second region have the same alkali ion concentration.

Condition 2: A length of the third region in a direction from the first region to the second region is 0.5 mm to 10 mm.

Condition 3: A voltage sweep range is −0.3V to +0.3V.

$$1.3 \leq G_{Na}/G_K \quad \text{(Equation 1)}$$

In Equation 1, $G_{Na}$ is a conductance (μS) when the alkali ion is Na+, and $G_K$ is a conductance (μS) when the alkali ion is K+.

In addition, when the average diameter of the 2D material of the laminate is 100 nm to 10 μm, more specifically 100 nm to 900 nm, even more specifically 100 nm to 700 nm level, $G_{Na}$ in Equation 1 may be 25 μS or more, specifically 27 μS or more, and more specifically, 29 μS or more. Substantially, $G_{Na}$ may be 40 μS or less, but is not limited thereto.

Together or independently of this, a diffusion coefficient D of alkali ions, in particular, sodium ions, in the third region may be $5.0 \times 10^{-5}$ cm$^2$/s or more, specifically, $6.0 \times 10^{-5}$ cm$^2$/s or more, and more specifically, $7.0 \times 10^{-5}$ cm$^2$/s or more. Substantially, the diffusion coefficient may be $1 \times 10^{-4}$ cm$^2$/s or less, but is not limited thereto.

In an exemplary embodiment, specific capacity of the energy harvesting device may be 4000 μAh/g or more, and specifically 4100 μAh/g or more, but is not limited thereto.

In an exemplary embodiment, electromotive force (voltage) produced by the energy harvesting device may be 0.1 to 1.0V, specifically 0.1 to 0.5V, and more specifically 0.1 to 0.3V, but is not limited thereto.

Although not shown in FIG. 1, in the energy harvesting device according to an exemplary embodiment, ends of each of the first region and the second region may be terminals electrically connected to the outside of the laminated film. In detail, each of an upper surface of the end of the first region and an upper surface of the end of the second region may be electrically connected to the outside to supply electric power (electromotive force) generated by the energy harvesting device to an external device (load). Here, for a stable electrical connection, a metal coating layer may be formed on each of the upper surface of the end of the first region and the upper surface of the end of the second region, but the present invention cannot be limited by whether or not the metal coating layer is formed.

As known, an average annual relative humidity of the atmosphere is at the mid-60% level, and based on the month, the lowest is an average mid-50% level and the highest is late-70% level on average. Accordingly, the energy harvesting device according to an exemplary embodiment of the present invention may not require artificial humidity control to generate electric energy. However, if necessary, such as for the purpose of generating more stable and reliable energy, the energy harvesting device may further include a moisture supply unit for supplying moisture to a vapor phase (atmosphere) in contact with the laminated film. The moisture supply unit may be any known device used to supply gaseous moisture to the air, such as a general humidifier. In this case, the moisture supply unit may maintain the relative humidity of the atmosphere in contact with the energy harvesting device at 50% or more, 55% or more, 60% or more, 65% or more, 70% or more, 75% or more, or 80% or more, and lower than 100%.

The energy harvesting device according to an exemplary embodiment may further include a sealing member for sealing at least the laminated film to prevent contact with the atmosphere. The sealing member may be, for example, a sealing material (removable sealing material) for sealing the laminated film to prevent contact with the atmosphere or a film (e.g., an adhesive tape) covering the laminated film. By this sealing member, it is possible to prevent an unwanted operation (power production) of the device immediately after manufacture until a time of use by a user. The sealing member may be removed at the time of use by the user, by the removal of the sealing member, moisture contained in the atmosphere is liquefied by heterogeneous nucleation in the interlayer between the 2D crystal layers of the laminated film and conduction of alkali ions may start. Here, the relative humidity of the air contacted by the device may be adjusted by the moisture supply unit for faster operation (startup) of the device, and the use of the moisture supply unit may be stopped when the device starts to operate stably.

The present invention may include an energy harvesting module to which the aforementioned energy harvesting device is connected in series.

Specifically, the energy harvesting module may include a substrate; and two or more energy harvesting devices arranged to be spaced apart from each other on one surface of the substrate and connected in series. In this case, the energy harvesting device may be attached to the substrate, and a series connection between the energy harvesting devices may be made through ends of the first region and the second region of each energy harvesting device. The substrate is not particularly limited but may be a flexible substrate or a rigid substrate in consideration of use. Examples of the rigid substrate include glass, polycarbonate, acrylic polyethylene terephthalate, and the like, and examples of the flexible substrate include polyester-based materials such as polyester naphthalate and polycarbonate; polyolefin-based materials such as linear, branched, and cyclic polyolefins; polyvinyl-based materials such as polyvinyl chloride, polyvinylidene chloride, polyvinyl acetal, polystyrene and polyacrylic; cellulose ester bases such as cellulose triacetate or cellulose acetate; polysulfones such as polyethersulfone; and polyimide-based or silicone-based materials, but are not limited thereto.

Here, the laminated film of each of the energy harvesting devices spaced apart from each other in the energy harvesting module may have an upper surface and side surfaces, excluding the third region, exposed in the air.

In addition, a sealing member may be provided to prevent the laminated film of each energy harvesting device provided in the energy harvesting module from contacting the atmosphere, not at the energy harvesting device level, but at the energy harvesting module level. A sealing material or a film (a water impermeable film) covering the laminated film may be further provided, and the sealing material or the film may be separated (removed) at the time of use by the user, and the laminated film may come into contact with the atmosphere.

The present invention may include a method of using an energy harvesting device.

The method of using an energy harvesting device according to the present invention includes sealing at least a laminated film of the energy harvesting device using a sealing member to block contact with the atmosphere; and exposing at least the laminated film of the energy harvesting device to the atmosphere by removing the sealing member at the time of use of the device.

In an exemplary embodiment, the method of using the energy harvesting device includes removing an aqueous solution present between the layers of the laminated film so that conduction of alkali ions is stopped by applying heat to the laminated film exposed to the atmosphere at the time of stopping use of the device; and attaching (or reattaching) a sealing member so that the laminated film without an aqueous solution is sealed and blocked from contacting the atmosphere. Here, when considering an operating mechanism of the energy harvesting device according to the present invention, it is also possible to stop the use of the device by exposing the laminated film, exposed to the atmosphere, to the atmosphere or an atmospheric gas having a relative humidity of 0 to 30% instead of heat.

The present invention includes a method of manufacturing the energy harvesting device described above.

The method of manufacturing the energy harvesting device according to the present invention includes a) forming a resin strip by applying and curing a curable resin to cover both sides of a laminated film by traversing the laminated film in a width direction to divide the laminated film in which two-dimensional (2D) materials are stacked and assembled into a first region and a second region; and b) applying a first liquid containing alkali ions to the first region and drying the first liquid to introduce alkali ions into the first region.

The laminated film may be manufactured by a method generally used to form a laminate of a 2D material, such as filtering a dispersion of a 2D material under reduced pressure.

The resin strip may be manufactured by applying a curable resin to a region designed as the third region in the laminated film to cover at least both side surfaces, an upper surface of the designed region, and even a lower surface, if necessary, and applying heat or a curing agent and/or light such as ultraviolet light in consideration of spherical curability of the curable resin.

The introduction of alkali ions into the first region may be achieved by applying a solution containing alkali ions to the first region to satisfy a designed concentration, followed by drying to volatilize and remove a solvent of the solution. Here, other cations or anions (including counter ions of alkali ions) may exist together with alkali ions in the solution. Due to excellent selectivity of alkali ions, particularly, sodium ions, of the device according to an exemplary embodiment of the present invention, the solution may be seawater.

If necessary, in operation b), applying a second liquid having an alkali ion concentration lower than that of the first liquid to the second region and drying the second liquid may be further performed, but it is not necessary to apply the second liquid.

Figure 2A:
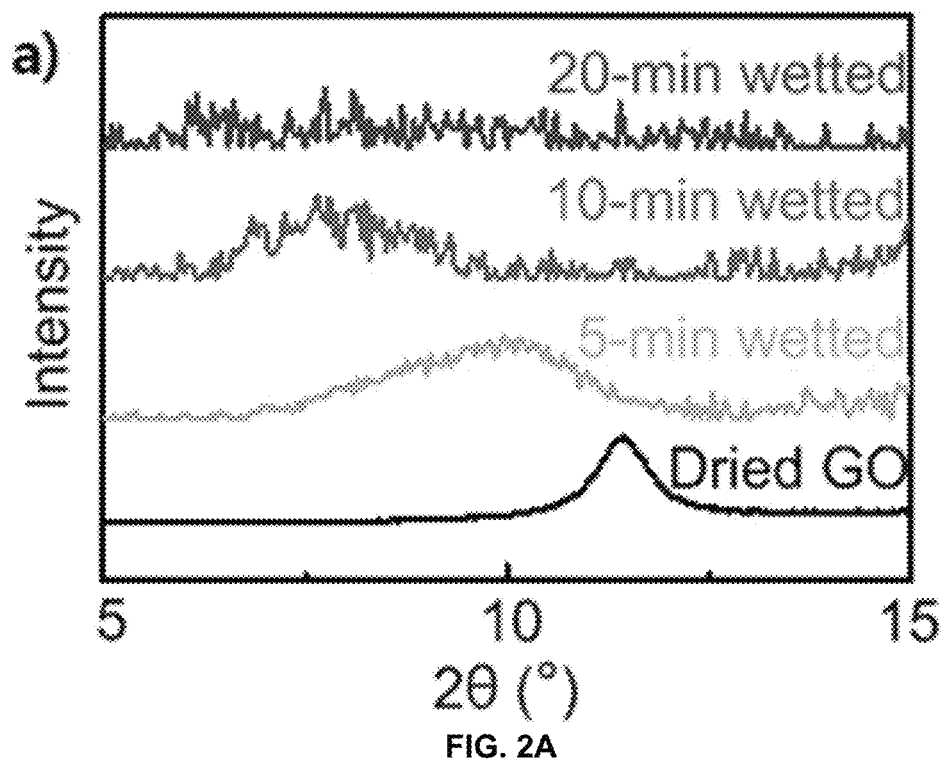
FIG. 2 is a view showing X-ray diffraction patterns measured before and after hydration of a laminate used in an energy harvesting device manufactured according to an exemplary embodiment of the present invention.
Figure 2B:
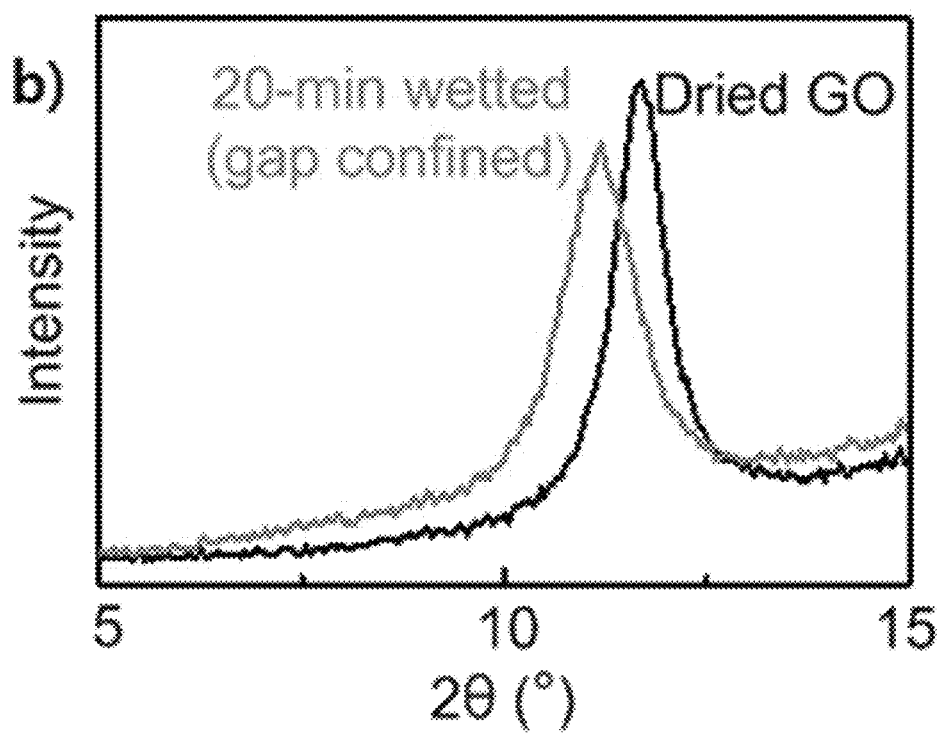

FIG. 2 shows X-ray diffraction patterns (FIG. 2A) before/after hydration of the laminate used in the energy harvesting device manufactured according to an exemplary embodiment of the present invention and X-ray diffraction patterns (FIG. 2B) according to the degree of hydration of a laminate having a physical constraining member.

In detail, FIG. 2A illustrates measured X-ray diffraction patterns of a dried laminate (dried GO), a laminate impregnated with water for 5 minutes (5-min wetted), a laminate impregnated with water for 10 minutes (10-min wetted), and a laminate impregnated with water for 20 minutes (20-min wetted). In addition, FIG. 2B shows X-ray diffraction patterns (gap confined) measured after forming a physical constraining member in the dried laminate (dried GO) and then dipping the laminate in water for 20 minutes. Specifically, the laminate was obtained by filtering and drying a graphene oxide dispersion having an average size of 2.5 μm under reduced pressure and had dimensions of 1.5 cm in length, 3 mm in width, and 5 μm in thickness. In addition, the laminate constrained by the constraining member is a sample prepared to verify the constraining effect of the constraining member, which was prepared by applying an ultraviolet curable resin to the entire both sides and the upper surface of the laminate in a dried state and then applying ultraviolet light to cure the laminate.

As can be seen from FIG. 2A, when the laminated is not constrained by a physical constraining member, water permeates between the 2D material layers and an interlayer distance increases gradually. Meanwhile, as can be seen from FIG. 2B, when the laminate is physically constrained by the constraining member, $2\theta$ moved about 0.46° even when impregnated with water for 20 minutes, and a change of only about 0.3 Å in terms of interlayer distance is observed. Through this, it can be seen that the interlayer distance between the 2D material layers is stably fixed and maintained even in water due to physical constraints.

In addition, when an interlayer distance of the laminate in a state in which the laminate is physically constrained and water is present between the layers to enable smooth ion conduction is calculated using the X-ray diffraction pattern of the constraining member in a state impregnated with water for 20 minutes, it can be seen that the interlayer distance is 7.9 Å. When a thickness of the 2D material (graphene oxide) is taken into consideration, it can be seen that an interlayer gap (a size of an empty space) of the physically constrained laminate is 4.5 Å, which is slightly larger than a diameter of sodium ions but smaller than a size of sodium ions in a hydrated state.

Figure 3:
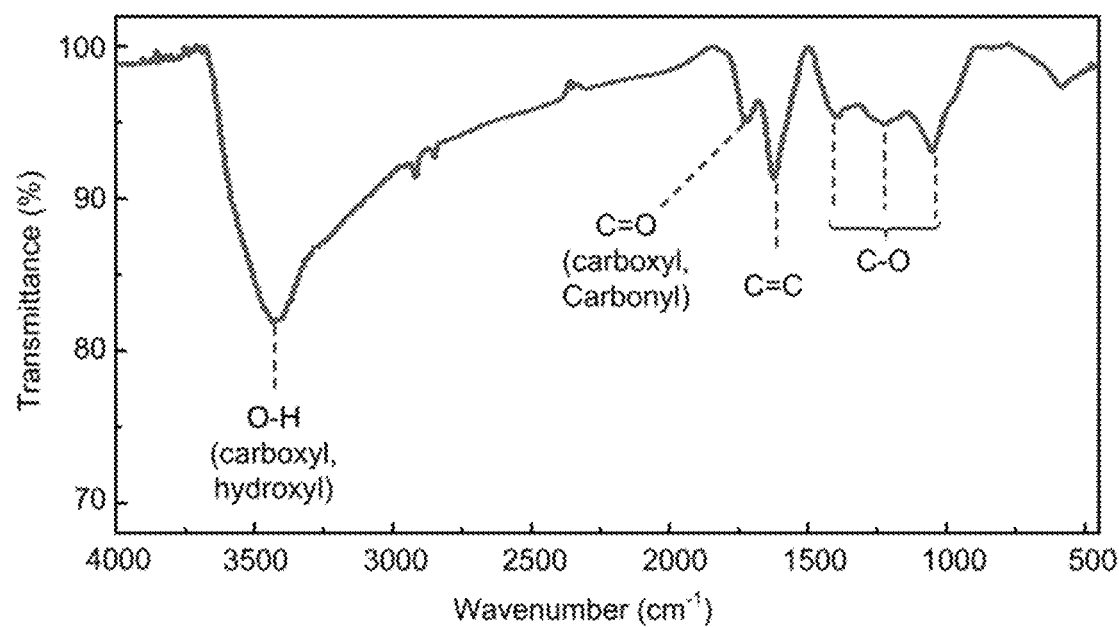
FIG. 3 is a view showing a measurement of an FT-IR spectrum of a laminate used in the energy harvesting device manufactured according to an exemplary embodiment of the present invention.

FIG. 3 is a diagram showing a measurement of the FT-IR spectrum of a manufactured laminate. As can be seen from FIG. 3, graphene oxide has an anionic functional group of a hydroxy group and a carboxyl group, and a ratio obtained by dividing a peak value of the O—H absorption peak by a peak value of C=O absorption peak in an absorption spectrum calculated by the transmittance (%) of 100%—transmittance of FIG. 3 is 3.79.

Figure 4:
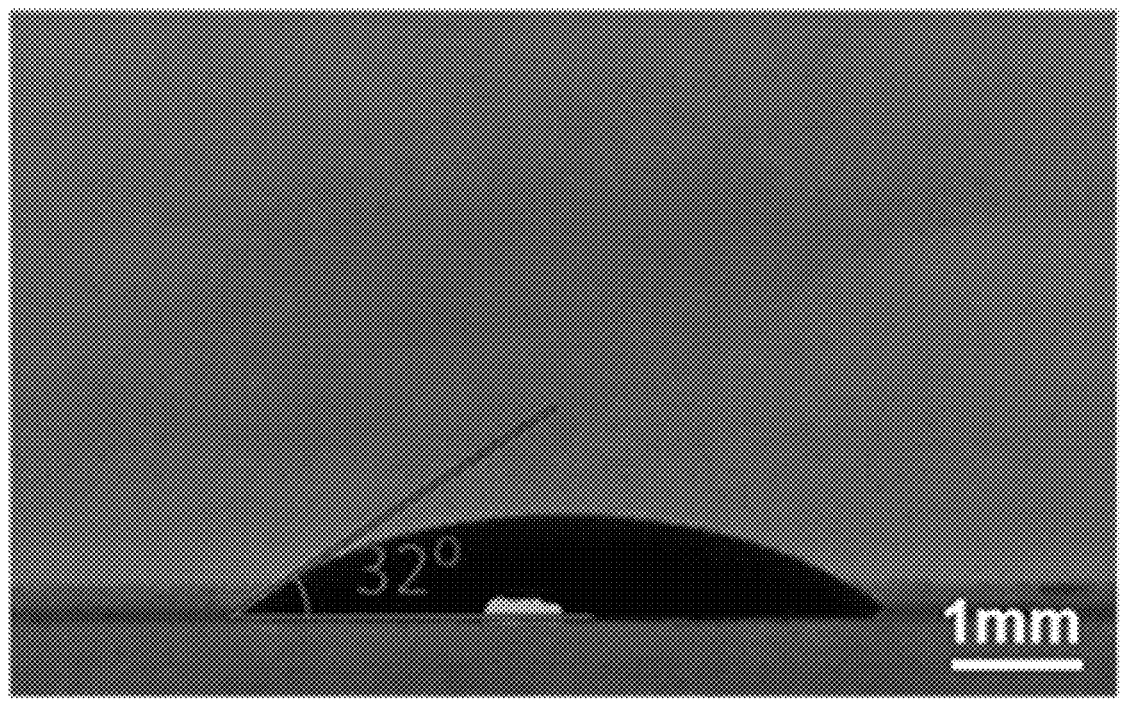
FIG. 4 is a view showing a measurement of a water contact angle of a laminate used in an energy harvesting device manufactured according to an exemplary embodiment of the present invention.

FIG. 4 is a view showing a measurement of a water contact angle of the manufactured laminate, in which it can be seen that a water contact angle is 32° and graphene oxide has high hydrophilicity by anionic functional groups.

Figure 5A:
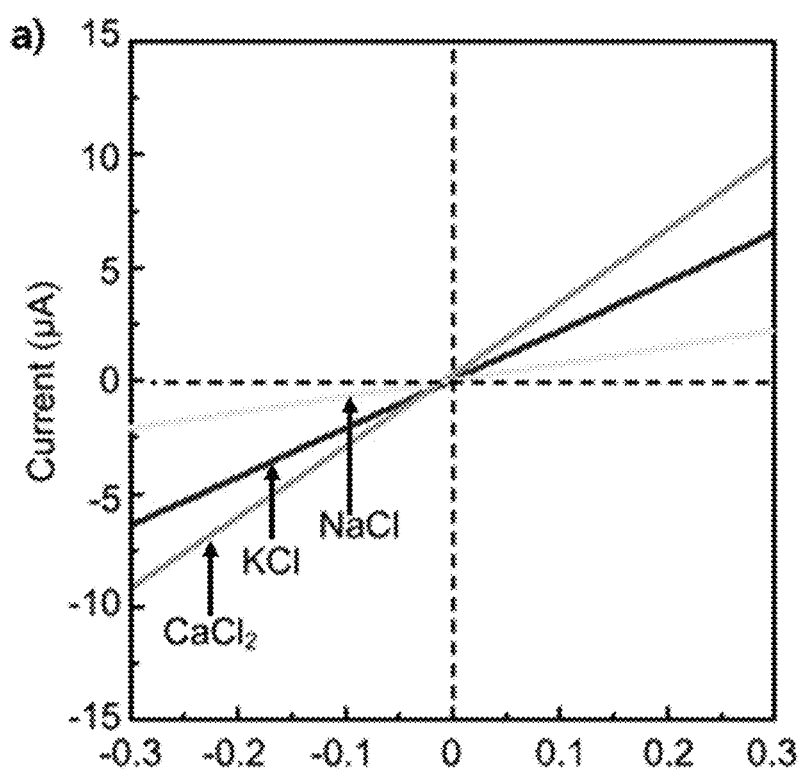
FIG. 5 is a current-voltage graph according to the types of cation of an energy harvesting device manufactured according to an exemplary embodiment of the present invention (FIG. 5A) and a view illustrating ohmic conductance according to the types of cation (FIG. 5B).
Figure 5B:
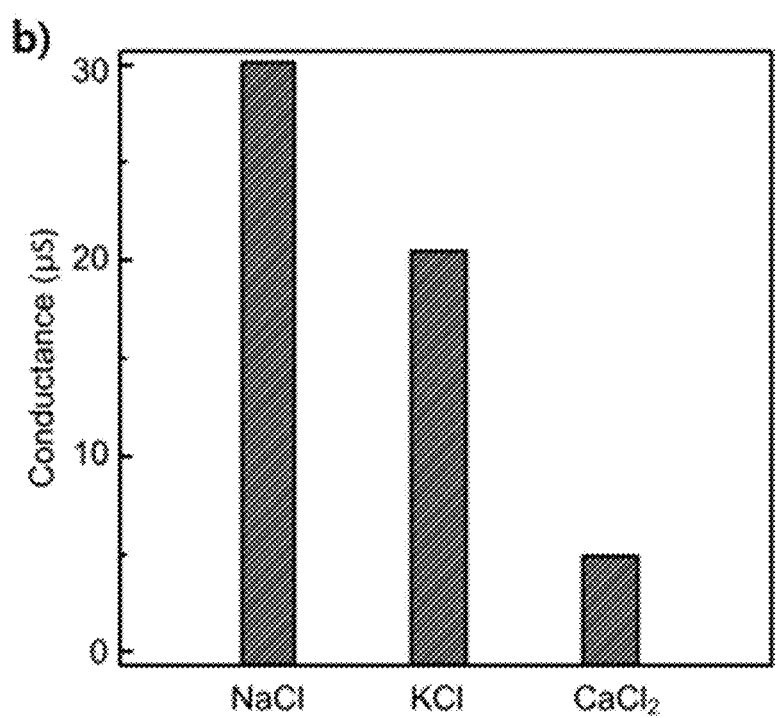

FIG. 5 is a current-voltage graph according to types of cation of an energy harvesting device manufactured according to an exemplary embodiment (FIG. 5A) and a view showing a summary of the ohmic conductance according to the types of cation (FIG. 5B).

In detail, the energy harvesting device of FIG. 5 is a sample prepared by forming a fixing member of a curable resin strip having a width of 1 mm by applying a curable resin to cover both sides by traversing the laminate in a width direction in the middle of the same laminate as that of FIG. 2 in a length direction and irradiating ultraviolet light thereto, and applying a NaCl aqueous solution having a concentration of 0.1 M, a KCl aqueous solution having a concentration of 0.1 M, or a $CaCl_2$ aqueous solution having a concentration of 0.1 M, which were applied in the same amount, to both regions divided by the curable resin strip and then wetting the first region and the second region with the cation aqueous solutions.

As shown in FIG. 5A, in the same electric field, it can be seen that dehydrated ions having a size smaller than the interlayer gap selectively pass through the third region. In addition, as shown in FIG. 5B, it can be seen that the energy harvesting device manufactured according to an exemplary embodiment of the present invention has a significantly higher ohmic conductivity (30.0 μS) in sodium ions than ohmic conductivity (20.1 μS) in potassium ions, which are major competing ions.

Figure 6:
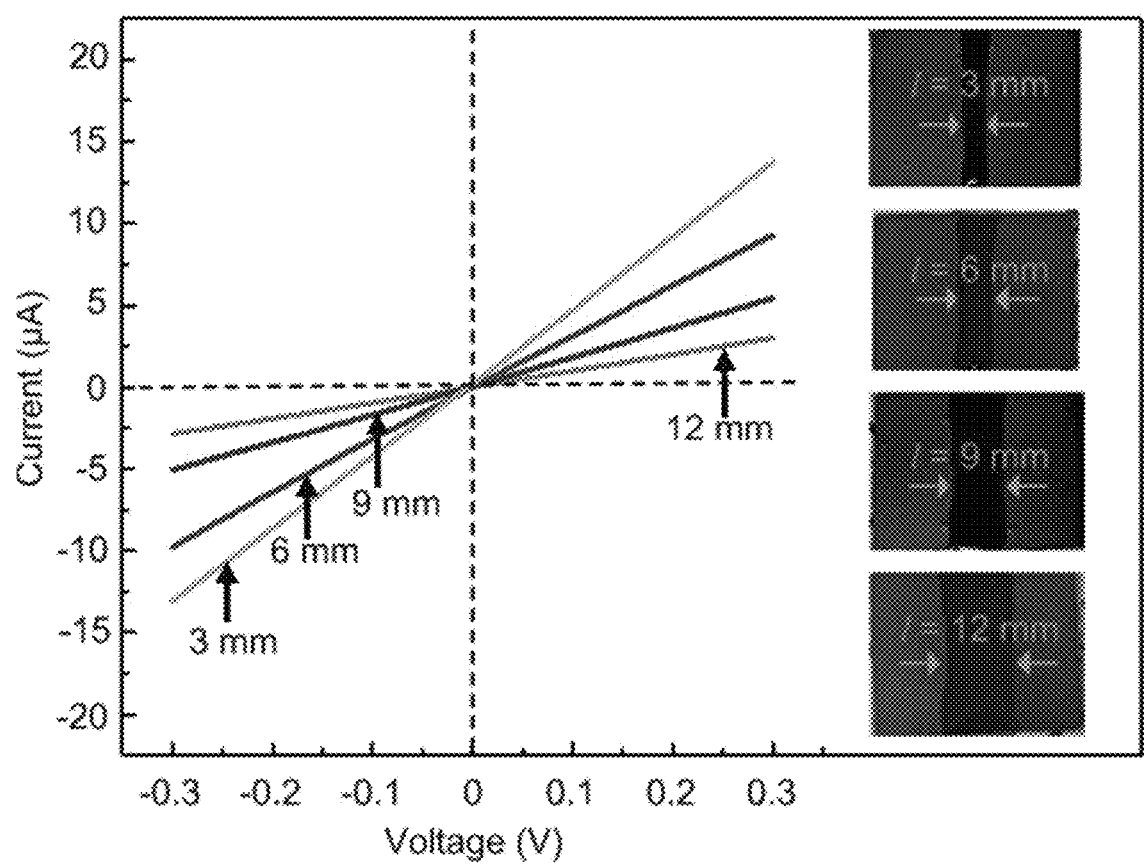
FIG. 6 is a measured voltage-current graph of an energy harvesting device according to a width of a third region in the energy harvesting device manufactured according to an exemplary embodiment of the present invention.

FIG. 6 is a diagram illustrating a measurement of a voltage-current graph of an energy harvesting device according to a width of the third region. Here, the voltage-current graph of FIG. 6 and the optical photograph observing the regions of the laminate in which curable resin strips have different widths from each other were inserted together. In detail, the energy harvesting device of FIG. 6 is a sample prepared similarly to the sample of FIG. 5, but the width of the curable resin strip was changed into 3 mm, 6 mm, 9 mm or 12 mm, a NaCl aqueous solution having a concentration of 0.1 M was applied in the same amount to both regions divided by the curable resin strip, and the first region and the second region were wetted. As can be seen from FIG. 6, it can be seen that ohmic conductivity increases as the width of the physically constrained region is shorter.

Figure 7:
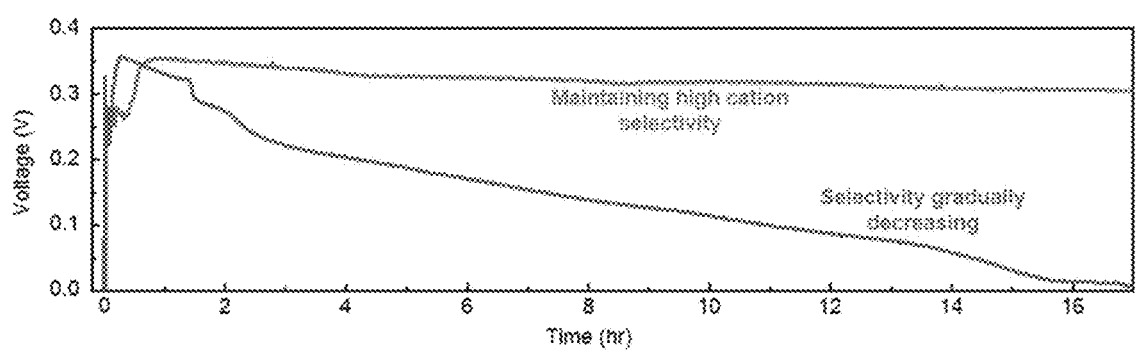
FIG. 7 is a view showing a measurement of power generation characteristics (Maintaining high cation selectivity) of an energy harvesting device manufactured according to an exemplary embodiment of the present invention, over time.

FIG. 7 is a view showing a measurement of power generation characteristics (red graph) of the energy harvesting device manufactured according to an exemplary embodiment of the present invention over time. In detail, energy harvesting device is a sample prepared similarly to the sample of FIG. 5, but an NaCl aqueous solution having a concentration of 1 M was drip-fed onto the first region and an NaCl aqueous solution having a concentration of 1 mM to the second region with same amount to both regions, which are divided by a fixing member of the curable resin strip having a width of 1 mm, and each region as wetted. Accordingly, in the prepared sample, a difference in sodium ion concentration between the first region and the second region is 1000 times with the third region interposed therebetween. For comparison, a comparison device equipped with only the first and second regions was prepared to have the same concentration difference as that of the energy harvesting device manufactured without forming a curable resin strip and without a physical constraining member, and power generation characteristics thereof were also measured and illustrated as the green graph.

As can be seen from FIG. 7, in the case of the energy harvesting device manufactured according to an exemplary embodiment, it can be seen that chemical energy having a concentration difference of 1000 times was converted into electromotive force (electric energy) of about 0.32 V by sodium ion conduction and a redox reaction. In this case, the redox reaction may be due to a difference in activity of $Cl^-$, which is a counter ion, in both regions. In addition, as shown in FIG. 7, it can be seen that the interlayer distance between the 2D material layers is stably fixed and maintained by the physical constraining member and steady-state diffusion of sodium ions is made in the third region over time and a certain electromotive force is stably generated for a long period of time. Meanwhile, without the physical constraining member, the diffusion of the non-steady state and the selective ion conduction characteristics disappear due to an increase in the interlayer distance over time, and it can be seen that it is impossible to generate energy already at a point of about 16 hours.

Figure 8:
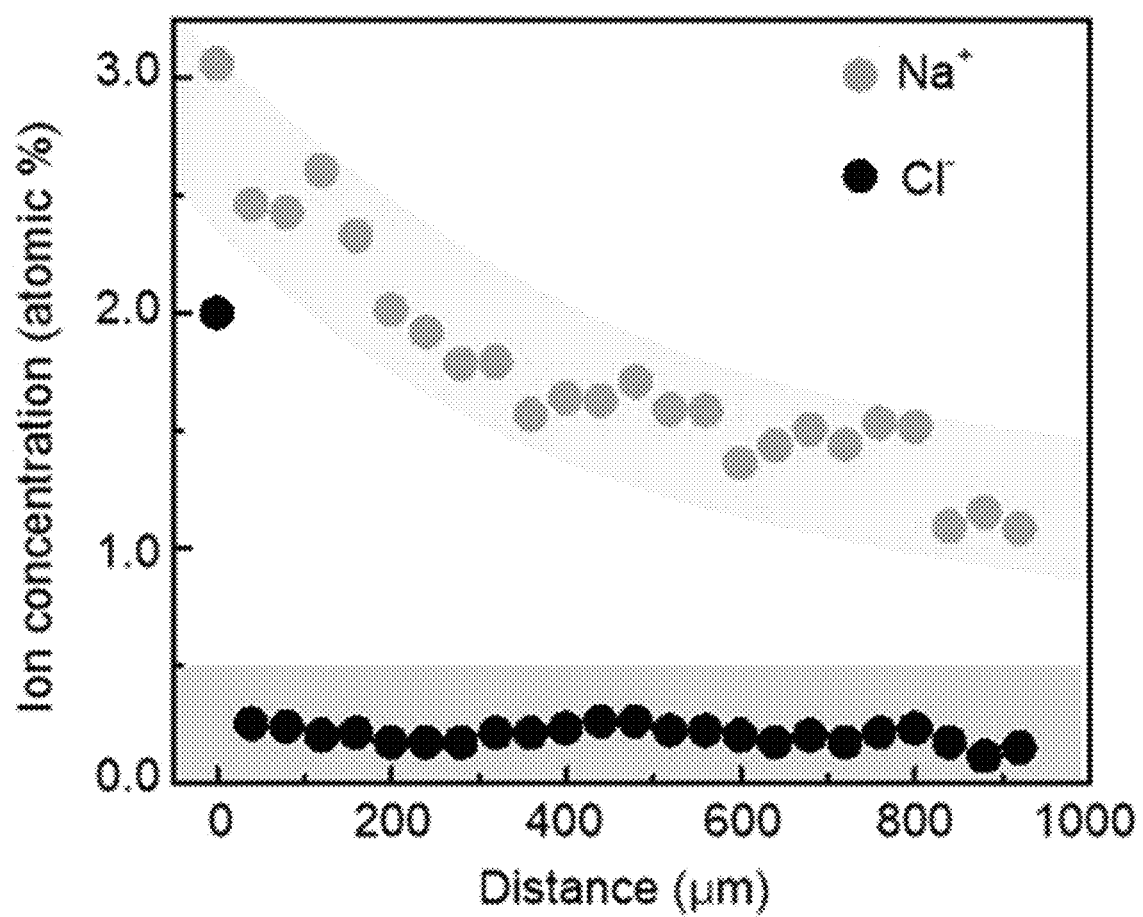
FIG. 8 is a view showing a measurement of an elemental analysis result according to a distance in a width direction of a third region in a power generation state of an energy harvesting device manufactured according to an exemplary embodiment of the present invention.

FIG. 8 shows a measurement result of element analysis (measured a cross-section of the third region of the corresponding distance by energy dispersive X-ray spectroscopy) according to a distance of the third region in the width direction at a time of 5 seconds based on a boundary of the first region and the third region as the origin in testing electric power production over the same time as that of FIG. 7. Here, the time point of 5 seconds may be regarded as a time point at which an electromotive force of 0.32 V is already generated, and thus, diffusion of sodium ions in an equilibrium state occurs.

As shown in the element profile shown in FIG. 8, it can be seen that the sodium concentration decreases as the distance increases in the width direction in the third region, and it can be seen that chlorine does not exist substantially in the third region. Under a boundary condition that sodium concentrations are maintained constant (3.06 at % and 1.08 at %) at the boundary between the first region and the third region and the boundary between the third region and the second region, it can be seen that, when a diffusion coefficient D of sodium ions in the third region is calculated, the diffusion coefficient of sodium ions in the third region in which size constraints exist is $7.7 \times 10^{-3}$ cm$^2$/s, which is greater than $1.3 \times 10^{-3}$ cm$^2$/s, which is a bulk (medium=water) diffusion coefficient of sodium ions. This increased ion mobility in the third region may be interpreted as being due to dehydration of the sodium ions.

Figure 9A:
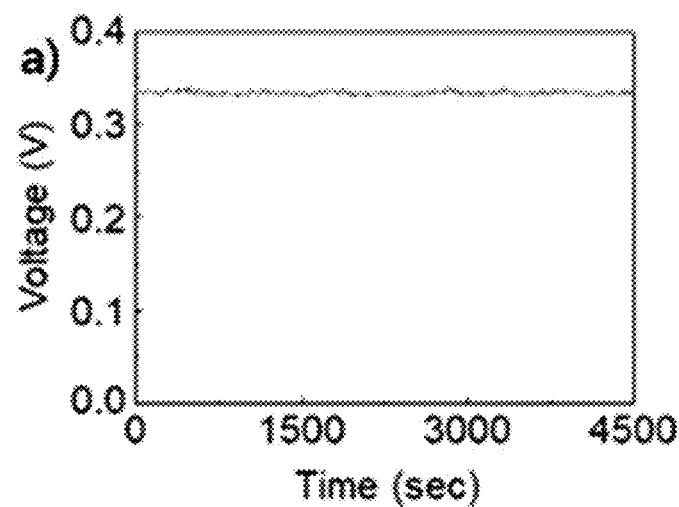
FIG. 9 is a view showing measured power generation characteristics over time in a wetting state (FIG. 9A), a dry state (FIG. 9B), and a 60% relative humidity atmospheric state (FIG. 9C) of an energy harvesting device manufactured according to an exemplary embodiment of the present invention.
Figure 9B:
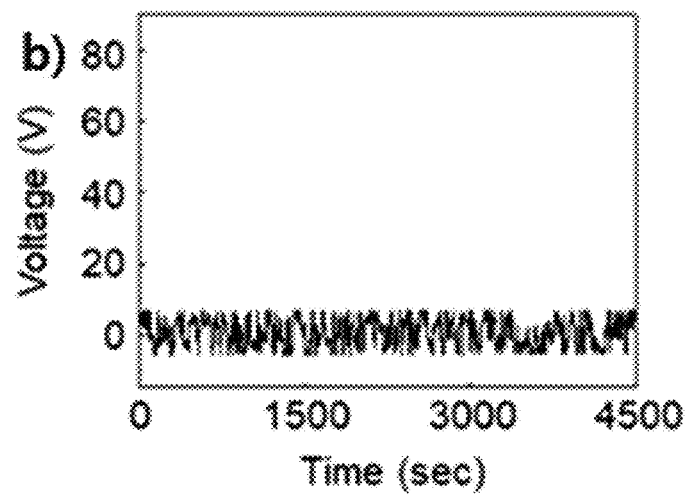
Figure 9C:
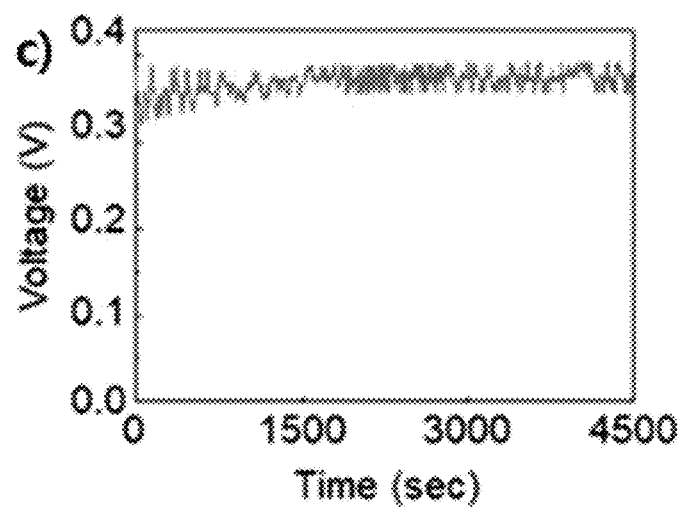

FIG. 9 is a view showing a measurement of power generation characteristics of the energy harvesting device manufactured according to an exemplary embodiment of the present invention over time in a wetting state (FIG. 9A), a dry state (FIG. 9B) and a 60% relative humidity in the atmosphere (FIG. 9C). The energy harvesting device used in FIG. 9 is the same as the sample of FIG. 7. However, in the wetting state, the first region is wet with an NaCl aqueous solution of NaCl having a concentration of 1M and the second region is wet with an NaCl aqueous solution of NaCl having a concentration of 1 mM, and in the dry state, an NaCl aqueous solution having a concentration of 1 M or 1 mM, in the same amount, as the wetting state was applied to each region and water was volatilized and removed by drying. In the dry state, power generation characteristics test over time was measured under the condition that relative humidity did not exceed 20%. The 60% relative humidity in the atmosphere means the dried energy harvesting device was exposed to the atmosphere in which relative humidity was adjusted to 60%.

As can be seen from FIG. 9, similarly to the previous experiment, it can be seen that an electromotive force of 0.32 V was stably generated in the entire test time of 4500 s in a state in which the laminate was wet in the NaCl aqueous solution and the movement of sodium ions in the dry state was not smooth and electric power production was stopped. However, it can be seen that, when the dried energy harvesting device was exposed to an atmosphere with 60% relative humidity, water was filled between the 2D material layers due to heterogeneous nucleation between the 2D material layers within a very short time and an electromotive force of 0.32 V was generated again.

In addition, without preparing samples according to the wetting state, the dry state, and 60% relative humidity, the energy harvesting device in the wetting state was developed for a certain period of time and then dried to examine electric power generation characteristics in the dry state for a certain period of time, and the dried energy harvesting device was exposed to an atmosphere of 60% relative humidity to examine electric power generation characteristics for a certain period of time, and reversibility of electric power production according to dry and non-dry conditions was tested. As a result, it was confirmed that electric power production, which was stopped by drying in a single energy harvesting device, was resumed at a level in the wetted state again by the liquefaction of moisture in the atmosphere. In addition, it was confirmed that no water droplets were formed on a surface of the laminate during the whole time of electric power production test when exposed to 60% relative humidity atmosphere.

Figure 10:
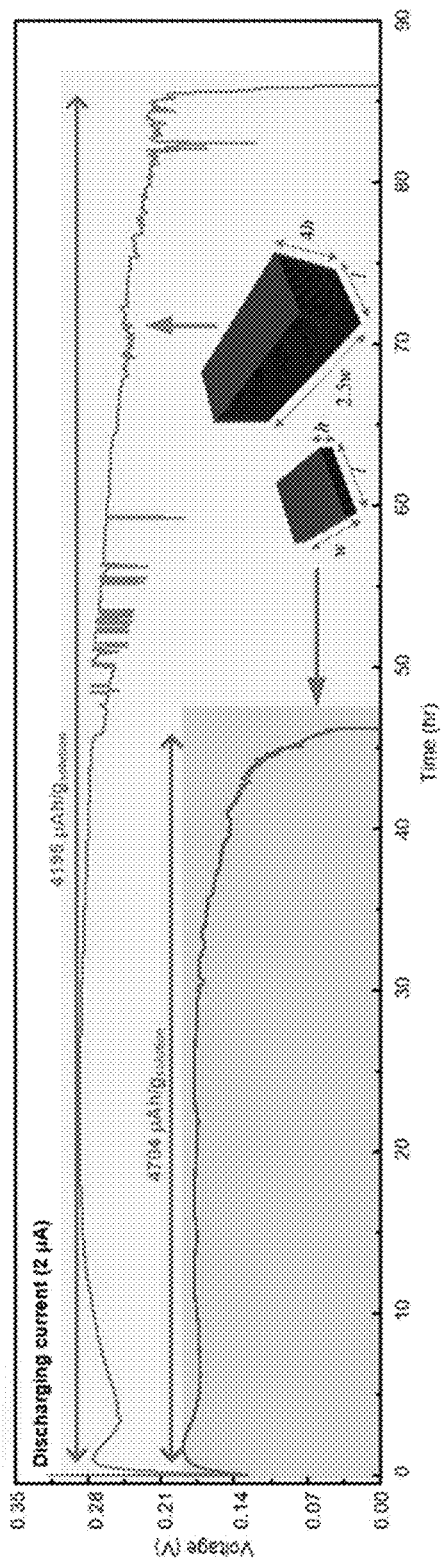
FIG. 10 is a view showing a measurement of discharge characteristics of energy harvesting devices manufactured with different dimensions according to an exemplary embodiment of the present invention over time under constant current (CC) conditions.

FIG. 10 is a diagram illustrating a measurement of discharge characteristics of energy harvesting devices manufactured in different dimensions according to an exemplary embodiment of the present invention over time under constant current (CC) conditions. In detail, as materials and methods used in the manufacture of the laminate of FIG. 2, a laminate having a length of 1.5 cm, a width of 3 mm, and a thickness of 5 μm and a laminate having a length of 4 cm, a width of 3 mm, and a thickness of 20 μm, were separately manufactured, and then a third region fixed in interlayer distance by a physical constraining member was manufactured by forming a curable resin strip having a width of 1 mm at the center of each laminate in a length direction. Thereafter, an energy harvesting device having a smaller dimension (hereinafter, referred to as a first energy harvesting device) by dropping an NaCl aqueous solution of NaCl having a concentration of 1 M in the first region of each laminate and an NaCl aqueous solution of NaCl having a concentration of 1 mM in the second region and drying and an energy harvesting device (hereinafter, referred to as a second energy harvesting device) having a larger dimension were manufactured. When the NaCl aqueous solution was dropped, the amount dropped to the laminate having a larger dimension was twice the amount dropped to the laminate having a smaller dimension. Here, the discharge test was performed under the condition of 90% relative humidity and under the condition of 2 μA constant current (CC).

As can be seen in FIG. 10, both the first energy harvesting device and the second energy harvesting device exhibited stable discharge characteristics, and the first energy harvesting device had a specific capacity of 4704 μAh/g and the second energy harvesting device had a specific capacity of 4195 μAh/g.

In addition, as can be seen from the discharge test result of FIG. 10, as the dimension of the laminate increases, a cross-sectional area of the third region increases in the direction from the first region to the second region, and it can be seen that, under the CC condition, a discharge voltage increased from 0.16V to 0.25V or more. Here, as shown in FIG. 7, an open circuit voltage (Voc) of the first energy harvesting device was 0.32 V.

In the same manner as the sample prepared in FIG. 10, a modularization test was performed by connecting the first energy harvesting device or the second energy harvesting device in series.

Figure 11:
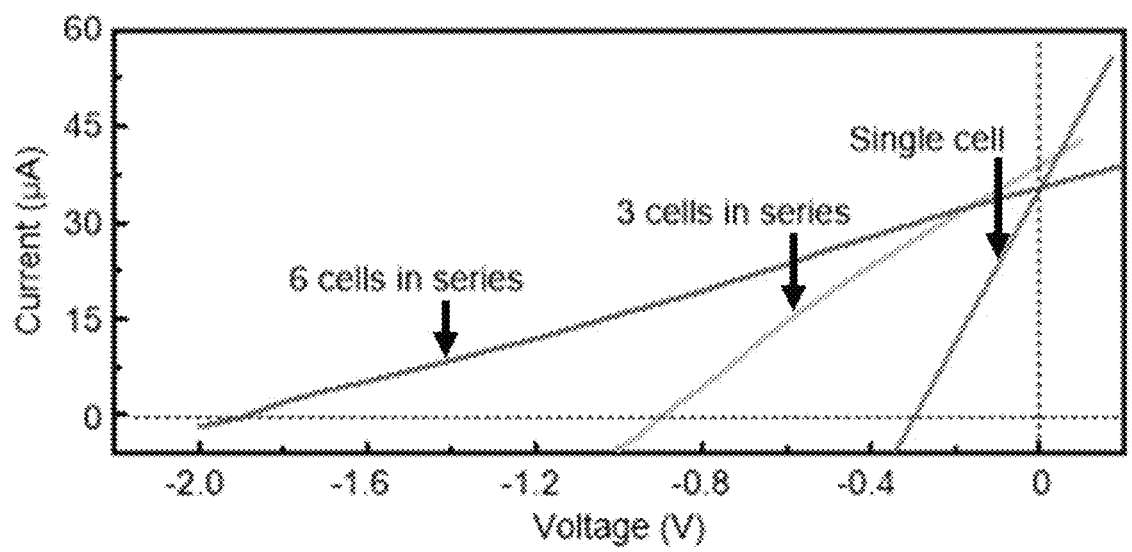
FIG. 11 is a view showing voltage-current characteristics of an energy harvesting module manufactured according to an exemplary embodiment of the present invention.

FIG. 11 is a diagram showing voltage-current characteristics of a module in which an energy harvesting device is connected in series. As can be seen from FIG. 11, the open circuit voltage (Voc) of a single energy harvesting device (single cell in FIG. 11) was 0.32 V, the open circuit voltage (Voc) of a module in which three first energy harvesting devices were connected in series (3 cells in series in FIG. 11) was 0.89 V, and the open circuit voltage (Voc) of a module in which six first energy harvesting devices were connected in series (6 cells in series in FIG. 11) was 1.9 V. This shows that an output voltage increases linearly as the number of energy harvesting devices connected in series increases.

Figure 12:
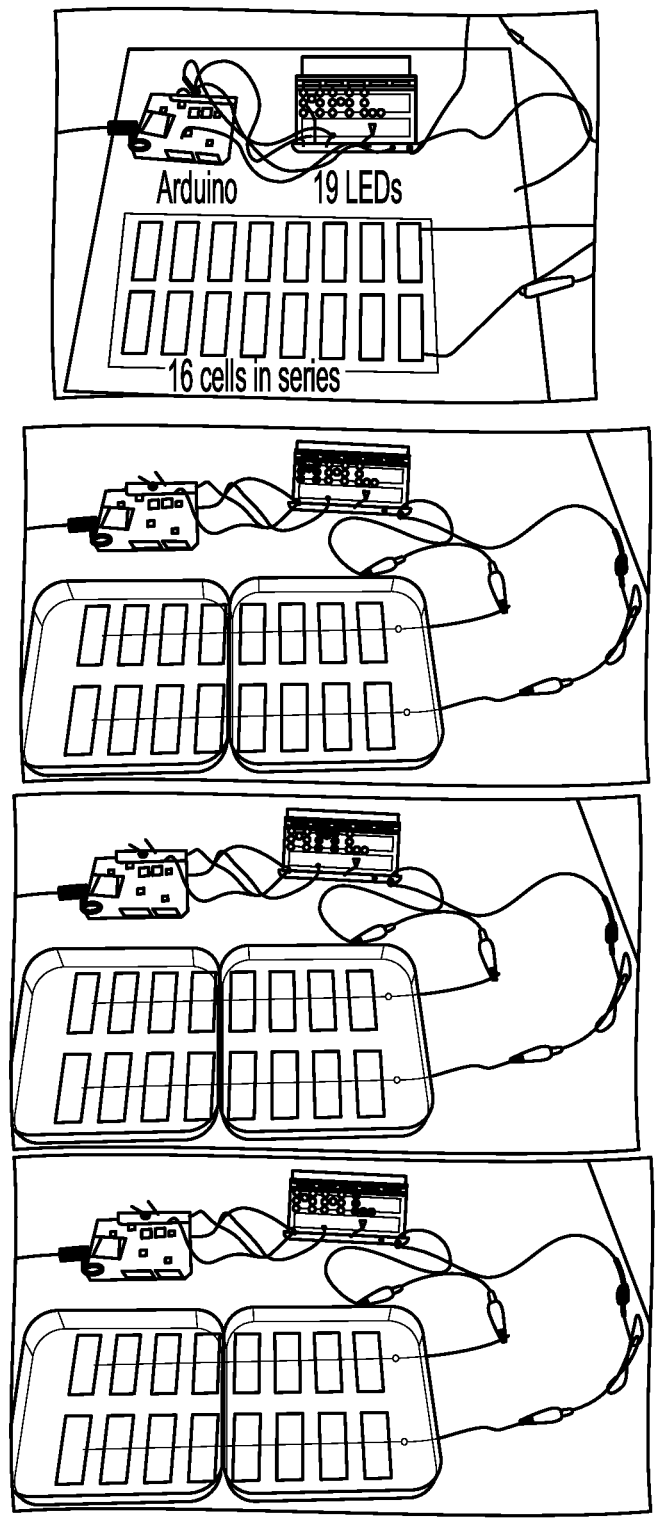
FIG. 12 is an optical photograph observed after connecting an energy harvesting module manufactured according to an exemplary embodiment of the present invention to a rod (a red light emitting diode array).

FIG. 12 is a diagram showing a test result in which 16 second energy harvesting devices were connected in series to be modularized and the module was connected to a load, as an array of 19 red light-emitting diodes (LEDs) programmed with an Arduino. Here, the open circuit voltage of the module was 4.5 V, a short-circuit current Isc was 93 μA, and output power was 105.75 μW. As can be seen from FIG. 12, a light emission intensity and operation of the LED array were substantially the same as a light emission intensity and operation when a commercial alkaline battery is connected.

Figure 13:
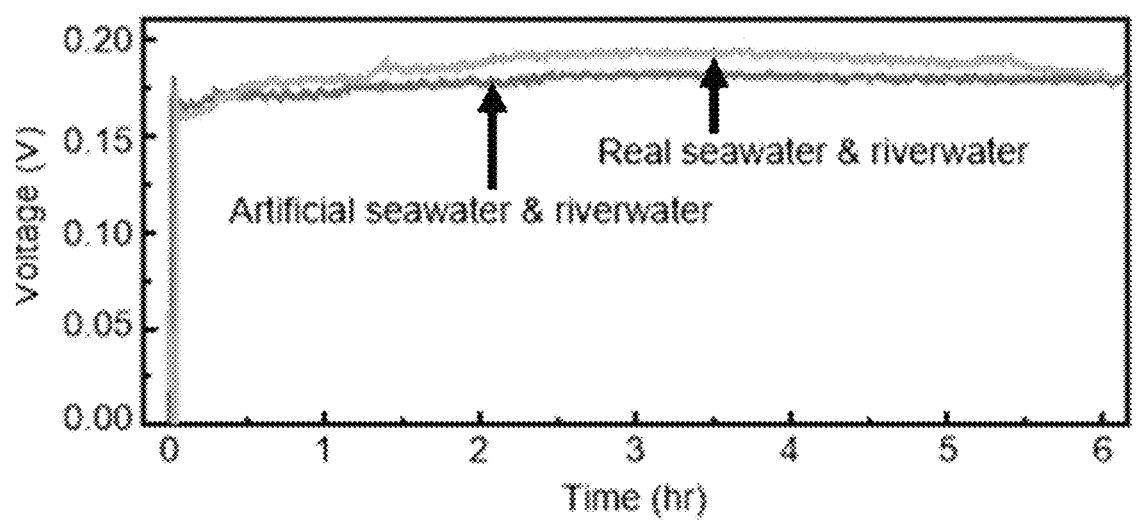
FIG. 13 is a view showing a result of testing the power generation characteristics of an energy harvesting device manufactured using seawater, according to an exemplary embodiment of the present invention.

FIG. 13 shows results (real seawater & riverwater in FIG. 13) of a test of electric power generation characteristics after wetting the first region using seawater and wetting the second region using fresh water (river water) in an energy harvesting device manufactured according to an exemplary embodiment of the present invention. Seawater contained sodium ions having a concentration of about 0.5 M, and fresh water contained sodium ions having a concentration of about 0.01 M. Here, for comparison, results of measurement of a reference sample (artificial seawater & riverwater in FIG. 13) in which the first and second regions of the laminate were wetted with a NaCl aqueous solution having a concentration of 0.5 M and an NaCl aqueous solution having a concentration of 0.01 M instead of seawater and fresh water are also shown.

As can be seen from FIG. 13, even in the case of using seawater in which a large amount of competing ions exist and using unrefined natural seawater and river water, it exhibits the same electric power generation characteristics as an aqueous solution prepared by artificially dissolving NaCl.

The energy harvesting device according to the present invention includes a laminated film in which a 2D material is stacked and assembled, and has an interlayer distance smaller than a size of alkali ions hydrated by the 2D material layer and similar to a size of the dehydrated alkali ions, thereby satisfying size characteristics of a neural energy production mechanism.

In addition, even when the energy harvesting device according to the present invention contacts a liquid medium including water, the interlayer distance between the 2D material layers is fixed/maintained without being substantially changed by the physical constraining member, thereby satisfying structural stability characteristics of neural energy production mechanism.

In addition, in the energy harvesting device according to an exemplary embodiment of the present invention, the 2D material has an anionic functional group, so that the third region enabling selective alkaline ion conduction may satisfy the filtering characteristics of the neural energy production mechanism.

As a commercially advantageous example, the energy harvesting device that satisfies size characteristics and structural stability characteristics, and further, filtering characteristics, may stably produce electric energy using seawater and river water.

In addition, the energy harvesting device according to the present invention may be implemented with only a laminate of 2D materials in which alkali ions are introduced into a design region and a fixing member, and thus, the energy harvesting device may be effectively utilized in a flexible power generation device or a wearable power generation device.

In addition, in the energy harvesting device according to the present invention, generation power (current or voltage) may be designed by changing a concentration difference of the introduced alkali ions or the dimensions of the laminate.

In addition, since the energy harvesting device according to an exemplary embodiment of the present invention is free from the electrolyte, it does not require a sealing member for sealing the electrolyte, is free from a risk of solution leakage to the outside of the device, and can become compact.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. An energy harvesting device for producing electric power by conduction of alkali ions, the energy harvesting device comprising: a laminated film in which two-dimensional (2D) materials are laminated and assembled, wherein the laminated film includes: a first region into which alkali ions are introduced; a second region into which alkali ions are introduced at a concentration lower than that of the first region; and a third region located between the first region and the second region to divide the first region and the second region, and in which an interlayer distance between the 2D materials is fixed by physical constraints, wherein the energy harvesting device produces energy as alkali ions move from the first region to the second region through the third region.

2. The energy harvesting device of claim 1, further comprising:
a liquid in which moisture contained in a vapor phase is transformed into a liquid phase between layers of the 2D materials.

3. The energy harvesting device of claim 1, wherein ends of each of the first and second regions are terminals electrically connected to the outside of the laminated film.

4. The energy harvesting device of claim 1, wherein, in the third region, an interlayer distance of the laminated film is 4 Å to 9 Å.

5. The energy harvesting device of claim 1, wherein the physical fixing is made by a resin strip attached to the laminated film so as to cover both sides of the laminated film by traversing the laminated film in a width direction.

6. The energy harvesting device of claim 5, wherein a length of the resin strip in a direction from the first region to the second region is 0.5 mm to 10 mm.

7. The energy harvesting device of claim 1, further comprising:
a moisture supply unit supplying moisture to a vapor phase in contact with the laminated film.

8. The energy harvesting device of claim 1, wherein an average diameter of the 2D materials is in the order of $10^2$ nanometers to $10^1$ micrometers.

9. The energy harvesting device of claim 1, wherein the 2D material is graphene, graphene oxide, MXene, transition metal dichalcogenide, or a combination thereof.

10. The energy harvesting device of claim 1, wherein the 2D material has an anionic functional group.

11. The energy harvesting device of claim 10, wherein the anionic functional group includes a hydroxy group and a carboxyl group, and a ratio obtained by dividing a peak value of an O-H absorption peak by a peak value of an C=O absorption peak in a Fourier transform infrared (FT-IR) spectrum of the laminate is 2.0 or more.

12. The energy harvesting device of claim 10, wherein a water contact angle of the laminate is between 10° and 35°.

13. The energy harvesting device of claim 1, wherein when the following conditions 1, 2, and 3 are satisfied, an ohmic conductance between the first region and the second region satisfies Equation 1:
Condition 1: The first region and the second region have the same alkali ion concentration,
Condition 2: A length of the third region in a direction from the first region to the second region is 0.5 mm to 10 mm,
Condition 3: A voltage sweep range is −0.3V to +0.3V, $$1.3 \leq G_{Na}/G_K \quad \text{(Equation 1)}$$

wherein $G_{Na}$ is a conductance (μS) when the alkali ion is Na+, and $G_K$ is a conductance (μS) when the alkali ion is K+.

14. The energy harvesting device of claim 1, wherein a total power or output voltage harvested by the energy harvesting device is controlled by one or more selected from one or more physical factors selected from a thickness, width, and length of the laminated film; and one or more chemical factors selected from a total number of moles of alkali ions introduced into the first region and a total number of moles of alkali ions introduced into the second region.

15. The energy harvesting device of claim 1, wherein a specific capacity of the energy harvesting device is 4000 µAh/g or more.

16. An energy harvesting module to which the energy harvesting device according to claim 1 is connected in series.

17. The energy harvesting module of claim 16, wherein the energy harvesting module includes:
- a substrate; and
- two or more energy harvesting devices arranged to be spaced apart from each other on one surface of the substrate and connected in series.

18. A method of using an energy harvesting device comprising:
- sealing at least the laminated film of the energy harvesting device according to claim 1 using a sealing member to block contact with the atmosphere; and
- removing the sealing member at the time of using the device to expose at least the laminated film of the energy harvesting device to the atmosphere.

\* \* \* \* \*